United States Patent [19]

Veach

[11] 3,969,606

[45] July 13, 1976

[54] ELECTRICALLY HEATED STYLUS FOR TRANSFERRING A PRINTING MEDIUM

[76] Inventor: Carlos W. Veach, 8921 Ashcroft Ave., Los Angeles, Calif. 90048

[22] Filed: Aug. 5, 1974

[21] Appl. No.: 494,473

[52] U.S. Cl. ................................ 219/237; 219/229; 219/533; 228/54; 338/302; 346/76 R; 401/1; 401/209

[51] Int. Cl.[2] ....................... H05B 3/00; B43K 7/00; B23K 3/02

[58] Field of Search .................... 219/221, 227–242, 219/533, 548; 401/1, 2, 209, 215, 216; 228/51–55; 346/76 R; 338/302

[56] References Cited

UNITED STATES PATENTS

| | | | |
|---|---|---|---|
| 1,447,730 | 3/1923 | Post | 219/238 |
| 1,656,690 | 1/1928 | Blackburn | 219/236 |
| 1,744,720 | 1/1930 | Blackburn | 219/240 |
| 2,031,532 | 2/1936 | Goldman | 219/239 |
| 2,185,266 | 1/1940 | Raffles | 219/239 |
| 2,454,576 | 11/1948 | Slack | 219/241 |
| 2,487,340 | 11/1949 | Kleinsmith | 401/209 X |
| 2,488,477 | 11/1949 | Rapaport | 219/237 X |
| 2,598,900 | 6/1952 | Frye | 219/237 |
| 2,998,503 | 8/1961 | Wotton | 219/238 |
| 3,811,030 | 5/1974 | Veach | 219/237 |

FOREIGN PATENTS OR APPLICATIONS

| | | | |
|---|---|---|---|
| 174,205 | 3/1935 | Switzerland | 219/227 |
| 268,631 | 4/1927 | United Kingdom | 219/239 |

*Primary Examiner*—A. Bartis
*Attorney, Agent, or Firm*—Victor C. Muller

[57] ABSTRACT

A hand manipulated electrically heated stylus tool for transferring insignia to an article from a ribbon or sheet having a coating on one face thereof subject to release and transfer to an article to be printed which operates on a 115 volt power supply without use of a voltage reducing transformer or temperature control means. The tool includes an aluminum mandrel with a surrounding sleeve of heat shrinkable Teflon on which a heating element of high resistance insulated wire is wound so that the sleeve provides back-up insulation between the wire and mandrel. The mandrel is provided with a bore which receives the tip portion of a conventional ball point pen, thus forming a heated stylus. The heated stylus assembly is disposed within a hollow frusto-conical support and is secured therein by a hardenable mixture forming heat insulation between the assembly and the support. As compared with a slidable stylus tip, the device operates smoother and with less pressure thus facilitating holding the ribbon in place on an article. The molded frusto-conical mandrel support and the potting cement therein also provides improved heat insulation resulting in a hotter stylus tip and cooler handle.

1 Claim, 4 Drawing Figures

ELECTRICALLY HEATED STYLUS FOR TRANSFERRING A PRINTING MEDIUM

BACKGROUND OF THE INVENTION

In my patent, U.S. Pat. No. 3,811,030, a hand manipulated electrically heated stylus tool is disclosed for transferring insignia to an article from a ribbon or sheet having a coating on one face thereof subject to release and transfer to the article to be printed. An important feature in the patent resides in an aluminum anodized mandrel around which an insulated heating coil is wound in abutting coils. The anodize coating serves several purposes. First, it serves as a back-up electrical insulator beneath the heater coil and in the event of breakdown of the insulation on some of the convolutions they are prevented from short circuiting through the aluminum mandrel which could otherwise cause some of the convolutions to burn out as a result of reduction in resistance between ends of the heater coil. Secondly, in the event the back-up anodizing beneath the convolutions should fail, the exposed tip of the mandrel will retain its insulation property and prevent the operator from receiving a shock in the event the exposed tip is contacted and the operator is otherwise in the circuit, such as by grounding of the operator. Lastly, the anodizing forms a hard wear resistant terminal end or stylus where it is moved over the ribbon which is coated with the transfer medium. While this construction meets certain safety codes and operates in an entirely satisfactory manner it was recognized that it could be further improved upon if the terminal end of the stylus could roll on the transfer medium rather than slide along same. It was also recognized that the tip end and ball of a ball point pen would provide the rolling contact desired but this presented certain difficulties in that the ball is steel and the tube to which it is affixed is brass, neither of which can be anodized to provide electrical insulation on the exposed stylus where a shocking voltage might be received by the operator.

SUMMARY OF THE INVENTION

The present invention retains substantially the same outer appearance as the former construction referred to and operates in like but improved manner. The principal differences are:

1. The aluminum mandrel is retained but is not anodized.
2. A ball point pen tip is secured within the mandrel.
3. The back-up insulation feature beneath the heating coil convolutions is retained but insulation other than an anodized coating is employed, and
4. The plug or closure which supports the mandrel is formed as two parts, one being a hollow conical molded member and the other being a potting cement which fills the cavity between the mandrel and plug.

The present construction thus comprises an unanodized aluminum mandrel to which a brass pen point tube and its attached steel ball are affixed, a heat shrinkable Teflon tube surrounding a portion of the mandrel, a heater coil formed of insulated wire surrounding the Teflon insulation in abutting convolutions, a molded hollow conical plug which contains the mandrel and heating coil, and a potting cement filling the space around the heating coil.

DESCRIPTION OF THE PREFERRED EMBODIMENT

Figure 1:
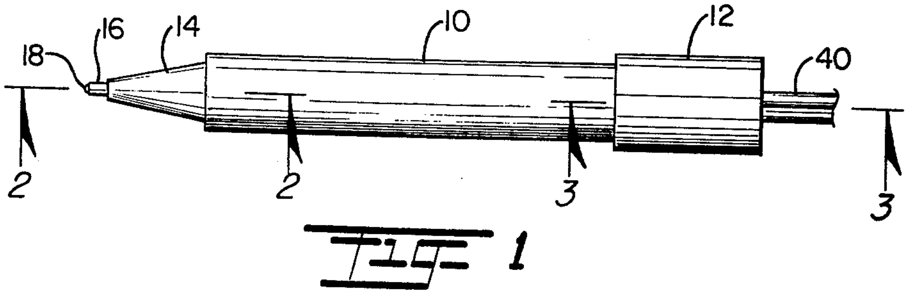
FIG. 1 is a full scale side elevation of the subject of the invention.

Referring now to the drawing, and first to FIG. 1, the subject of the invention comprises, briefly, a tube 10 closed at one end by a cap 12 and at its other end by a frusto-conical closure or plug 14 which supports a stylus 16.

Figure 2:
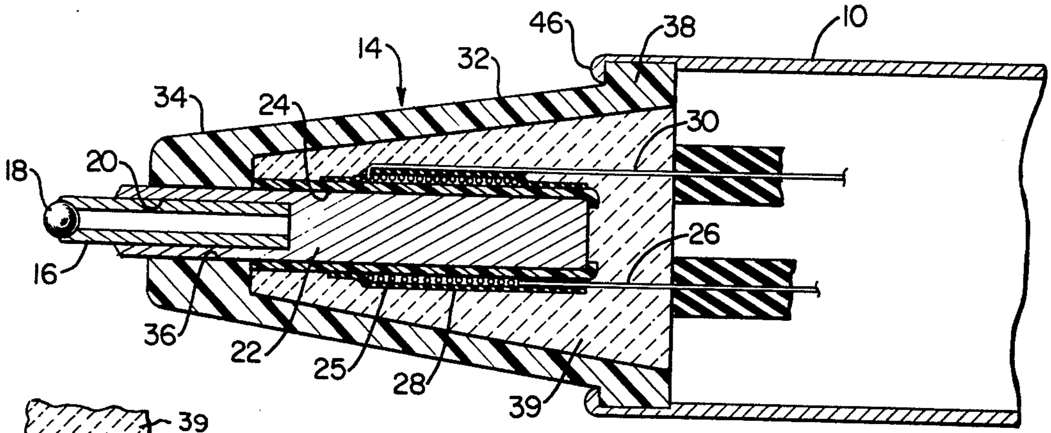
FIG. 2 is an enlarged section taken on line 2—2 of FIG. 1.
Figure 2A:
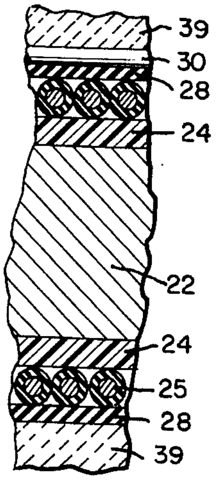
FIG. 2A is a fragmentary portion of FIG. 2 on an enlarged scale to more clearly show the details thereof.
Figure 3:
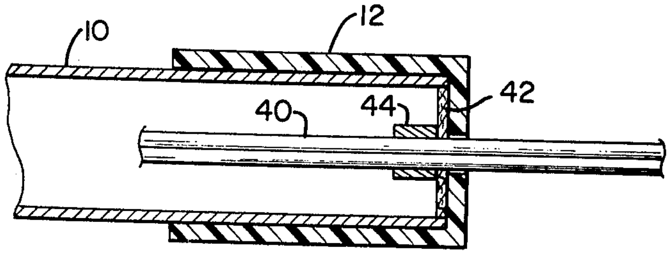
FIG. 3 is an enlarged section taken on line 3—3, FIG. 1.

As best shown in FIG. 2, stylus 16 is a brass tube which supports a rotatable steel ball 18, this construction being the tip portion of a commercially available ball point pen ink tube and ball suitably dimensioned in length to fit within a bore 20 within an aluminum mandrel or rod 22, such as by a light press fit.

A Teflon sleeve 24 is then telescoped over the mandrel and heat is applied causing it to shrink fit on the mandrel. The heater coil 25 is then wound around the sleeve in abutting convolutions, an exemplary form of wire being STABLOHM insulated with a coating of polyimide which electrically insulates adjacent convolutions with two thicknesses of insulation. As will be apparent, each convolution is electrically insulated from the mandrel by one thickness of polyimide plus the thickness of the Teflon sleeve. Thus, adjacent convolutions of the heater coil are double insulated from each other and each convolution is double insulated from the mandrel due to the Teflon sleeve. For operation on 115 volts the size of the wire and number of convolutions is chosen to provide a resistance of about 4100 ohms.

One end of a bare copper lead 26 is next affixed to one end of the heater coil and glass tape insulation 28 is wound around same and around the coil convolutions. A like lead 30 is then affixed to the other end of the heater coil and layed back on the outer surface of the glass tape insulation. An exemplary form of glass tape is PERMACEL F-212. The mandrel and its surrounding heater coil is now in condition for assembly into closure 14.

Closure 14 is frusto-conical in outer configuration and is provided with a frusto-conical cavity to provide a wall 32 of uniform thickness and closed at its outer or left end by a wall 34 having a bore 36 for receiving the mandrel. Its inner or left end is also provided with a flange 38 which fits the bore of the tube 10. The closure is preferably an injection molded plastic product, exemplary of which is CELANEX 3300 which is a polybutylene terephthlate thermoplastic polyester, supplied by the Celanese Plastic Company, Newark, N.J.

The mandrel assembly is next inserted into bore 36 and the space between same and wall 32 is filled with an electrically and heat insulating high temperature cement 39, exemplary of which is that supplied by Sauereisen Cement Co., Pittsburgh, Pa.

After cementing the mandrel and heater coil assembly in the frusto-conical closure, the bared ends of a duplex insulated conductor 40 are secured to leads 26, 30 in any suitable manner and insulated in any suitable manner, such as by heat shrinkable tubing. A fiber washer 42 is also threaded over conductor 40 and a suitable clamp or crimp 44 is applied to conductor 40 for strain relief on the portion of conductor 40 disposed within tube 10. The final assembly comprises forming a rolled end 46 on tube 10 adjacent flange 38 and cementing cap 12 to tube 10. As will be apparent, the sequence of construction and assembly as described is exemplary, only, and may be varied as desired.

The reason for employing the Teflon sleeve 24 in lieu of the anodizing in the patent referred to will now become more apparent. Anodizing as presently known can be applied only to a limited thickness which will insulate to something of the order of 1000 volts. Safety requirement, however, requires an insulation to the order of 2000 volts. The former construction met this requirement since there were two layers of insulation between the heating coil and the operator — one beneath the coil and the other between the stylus tip and the operator. This last layer was not available with the brass tube and steel ball since they cannot be anodized. It was thus necessary to meet the 2000 volt requirement across a single layer of insulation beneath the heater coil. This required some choice other than anodizing and a choice of a material which could be employed on the relatively small diameter of the mandrel. Experiments revealed that Teflon could meet the dielectric requirements and also the economics involved in the practical requirements of producing an acceptable device. It is to be understood, accordingly, that the selection of Teflon was a practical and economical selection and such material is not critical, the only important criteria being that the insulation employed serve in like manner and provide the requisite insulation across a single sleeve or coating beneath the heater coil.

As shown in FIG. 2, the left end of tube 10 is preferably counterbored to provide a shoulder which engages the right end face of flange 38 so that the flange is positively captured between the shoulder and rolled end 46.

What I claim is:

1. In a device for transferring a printing medium, forming a coating on one face of a sheet of material, and subject to release therefrom upon movement of a heated stylus along the opposite face of the sheet in a desired path, while the medium is in contact with an article to be printed, the improvements, in combination, comprising;

a. a hollow handle adapted to be grasped in the hand of an operator for freehand movement in a path corresponding to the configuration of insignia to be printed, b. said handle having a stylus supporting member extending outwardly from an end thereof formed of electrically insulated material of relatively low heat conductivity, c. a metallic mandrel carried by said member and having a portion disposed within said member in spaced relation thereto, d. a layer of electrical insulation surrounding and electrically insulating the surface of said portion, e. a continuous insulated wire of relatively high electrical resistance wound around said layer in a plurality of abutting coils, said coils forming a heating element for supplying heat to the mandrel through said layer, f. a metallic stylus comprising the tip portion of a conventional ball point pen extending outwardly from the exposed end of the mandrel, said stylus comprising a metallic tube with a rotatable steel ball secured to the end thereof, said ball being adapted to roll along said opposite face, the exposed portion of said stylus having an uninsulated electrically conductive outer surface, the stylus being in electrically conductive engagement with said metallic mandrel, said stylus supporting member being hollow and surrounding the heating element in spaced relation thereto, said space being completely filled with a potting material comprising a liquid cement mixture subject to hardening after being delivered to said space, g. means extending through said handle and connected to the heating element for supplying power thereto, and h. the construction and arrangement being such that said layer provides back-up insulation between the electrically heated heating element and the mandrel and prevents the introduction of a shocking voltage to the stylus through the mandrel in event of breakdown of the insulation on the heating element.

* * * * *